United States Patent [19]
Parris et al.

[11] Patent Number: 5,178,180
[45] Date of Patent: Jan. 12, 1993

[54] VALVE ASSEMBLY

[76] Inventors: Wannis C. Parris, 1171 Centerfield Ave., Niles, Mich. 49120; Duane P. Neuerberg, 202 W. Angela Blvd., South Bend, Ind. 46617; Keith F. Stelter, 1613 Lykins La., Niles, Mich. 49120

[21] Appl. No.: 758,639

[22] Filed: Sep. 12, 1991

[51] Int. Cl.⁵ .................. F16K 3/02; F16K 41/04; F16J 15/20; F16J 15/40
[52] U.S. Cl. ..................... 137/242; 251/214; 251/327; 251/328; 277/165; 277/188 A; 277/206 R
[58] Field of Search ............... 137/242, 244; 251/214, 251/326, 327, 328; 277/165, 188 A, 188 R, 206 R; 15/104.16

[56] References Cited

U.S. PATENT DOCUMENTS

| | | | |
|---|---|---|---|
| 1,612,039 | 12/1926 | Miller | 277/188 A |
| 2,731,282 | 1/1956 | McManus et al. | 277/59 |
| 2,774,371 | 12/1956 | Grannenfelt | 137/242 |
| 2,829,862 | 4/1958 | Wey | 137/242 |
| 3,319,661 | 5/1967 | Shindler | 277/188 R |
| 3,710,816 | 1/1973 | Prince | 137/242 |
| 3,993,092 | 11/1976 | Still | 251/328 |
| 4,206,905 | 6/1980 | Dobler | 251/328 |
| 4,773,440 | 9/1988 | Yanagawa et al. | 137/242 |
| 4,886,241 | 12/1989 | Davis et al. | 277/188 A |

Primary Examiner—George L. Walton
Attorney, Agent, or Firm—James D. Hall

[57] ABSTRACT

The present invention includes an improved transverse seal in a gate valve having an assembly portion and a gate. The assembly portion comprises a body, a chest and a top structure or bonnet. The improved transverse seal is located within the chest of the assembly portion and is in constant contact with the gate on each side of the gate. This transverse seal comprises a pliable, longitudinally extending casing of generally U-shaped cross section having a bottom member in contact with the gate and two oppositely disposed leg members. The bottom member is provided with a plurality of raised ribs. A packing material rests within the cavity of the casing, to provide support and pressure on the transverse seal. The oppositely disposed leg members also include longitudinally extending flanges at their distal ends. A rigid scraping blade is placed adjacent to each leg member and rests on its corresponding flange such that one edge of the scraping blade continuously contacts the gate. As these blades are placed at opposite sides of the casing, they produce a cleaning effect by wiping material from the gate. Furthermore, the positioning of the scraping blades adjacent to the leg member and its corresponding flange secures the transverse seal in its groove, and prevents "rolling" of the transverse seal into the gate receiving channel.

2 Claims, 2 Drawing Sheets

VALVE ASSEMBLY

BACKGROUND AND SUMMARY OF THE INVENTION

The present invention relates generally to valves and packing seals for valves. More particularly, the present invention relates to transverse seals for knife gate valves.

The objects of the present invention are attained by the provision of an improved transverse seal in a gate valve having an assembly portion and a gate. The assembly portion comprises a body, a chest and a top structure or bonnet. The improved transverse seal is located within the chest of the assembly portion and is in constant contact with the gate on each side of the gate. This transverse seal comprises a pliable, longitudinally extending casing of generally U-shaped cross section having a bottom member in contact with the gate and two oppositely disposed leg members. The bottom member is provided with a plurality of raised ribs. A packing material rests within the cavity of the casing, to provide support and pressure on the transverse seal. The oppositely disposed leg members also include longitudinally extending flanges at their distal ends. A rigid scraping blade is placed adjacent to each leg member and rests on its corresponding flange such that one edge of the scraping blade continuously contacts the gate. As these blades are placed at opposite sides of the casing, they produce a cleaning effect by wiping material from the gate. Furthermore, the positioning of the scraping blades adjacent to the leg member and its corresponding flange secures the transverse seal in its groove, and prevents "rolling" of the transverse seal into the gate receiving channel.

Other objects, advantages and novel features of the present invention will become apparent in the following detailed description of the invention when considered in conjunction with the accompanying drawing.

DESCRIPTION OF THE PREFERRED EMBODIMENTS

Figure 1:
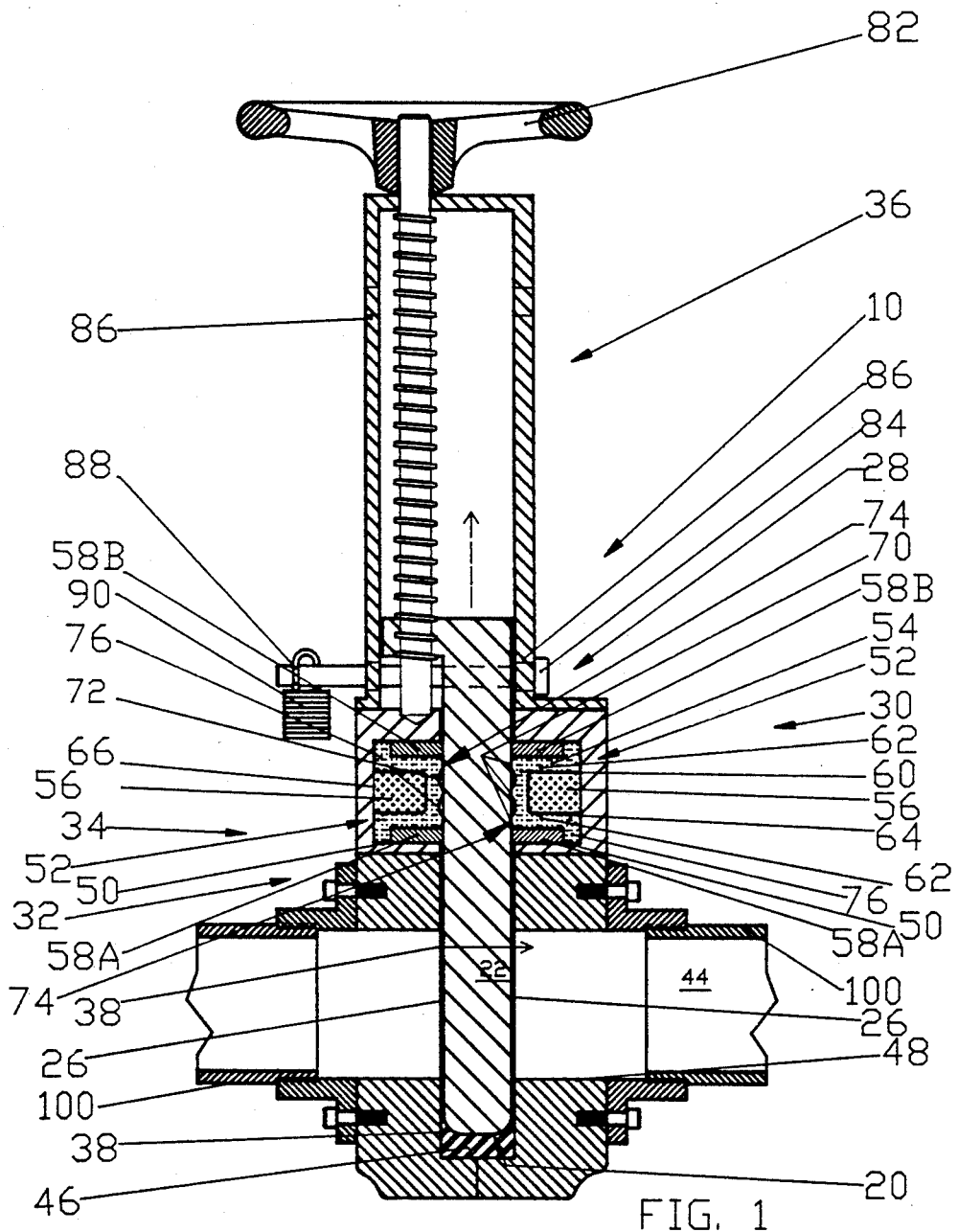
FIG. 1 shows a cross sectional view of a knife gate valve incorporating the present invention.

FIG. 1 illustrates a preferred embodiment of the present invention as included in a typical knife gate valve 10 which comprises gate 20 and assembly 30. Assembly 30 is typically constructed from an anti-corrosive heavy duty metal. Assembly 30 includes body 32, chest 34 and top structure or bonnet 36, with a gate receiving channel 38 extending throughout the interior of assembly 30. Pipe bore 44 provides an opening through the assembly 30. When knife gate valve 10 is connected between two sections of pipe 100, the valve is positioned so that the pipe aligns with pipe bore 44. Thus, material flowing through the pipe may freely flow through valve assembly 30 and into the next section of pipe, subject to control by gate 20.

Gate 20 is typically a flat, rectangular plate made from a chemical-resistant heavy-duty metal. The side edges 22 of gate 20 narrowly fit into gate receiving channel 38 allowing one-dimensional movement of gate 20 within assembly 30. Gate 20 may extend into body 32 of assembly 30, so as to completely block pipe bore 44. When in this position, gate 20 prevents the flow of the material through the valve assembly 30. Gate 20 may also be positioned within chest 34 and bonnet 36 of assembly 30. In this position, gate 20 does not interfere with pipe bore 44 or the flow of material therethrough.

Due to the nature of the function of knife gate valve 10 it is important that the valve include tight seals. Knife gate valve 10 includes two different seal arrangements. The first of these is peripheral seal 46 located in gate receiving channel 38. This seal is typically formed of a round, elastomeric chord stock. The side edges 22 of gate 20 are constantly in contact with this peripheral seal 46, as is generally known. This seal is packed to tightly fit against the side edges 22 of knife gate 20 and prevent the flow of material around the gate. When gate 20 is positioned so as to block the flow of material, the bottom edge 24 of gate 20 contacts peripheral seal 46.

Body 34 includes a pair of opposite longitudinally extending notches 50 which are cut into interior surface 48. Within these notches 50 (shown in the Figure only in cross section) is housed the second type of seal, the subject of the present invention. This seal is the transverse seal 52, which spans the entire width of gate receiving channel 38 and serves to further prevent leaking of fluid out of valve 10 along the planar surfaces 26 of gate 20.

Each transverse seal 52 extends longitudinally with each notch 50 and includes casing 54, packing 56, and scraping blades 58. Casing 54 has a substantially U-shaped cross section, and is preferably made from a pliable, anti-corrosive material, such as VITON. Other acceptable materials include EPDM and Buna-N. As will be readily understood by those persons of ordinary skill in the art the choice of material depends on the environment of intended use of the valve. Casing 54 includes a bottom member 60, and two oppositely disposed, transversely extending leg members 62. These three members generally form interior cavity 64. Casing 54 is situated in notch 50 so that bottom member 60 rests almost flush with interior surface 48 of chest 34, bottom member 60 extending slightly into gate receiving channel 38, and thus contacting gate 20 which is housed therein. The oppositely disposed leg members 62 are placed in notch 50, and abut the back wall 66 of notch 50.

Lower surface 68 of bottom member 60 continually contacts knife gate 20. Actuating valve 10 causes gate 20 to slide over lower surface 20. Since transverse seal 52 exerts a high pressure force against gate 20, this motion causes a frictional force. This force tends to produce wear on transverse seal 52 which can reduce its effectiveness. To maintain effective sealing, lower surface 68 of bottom member 60 is provided a plurality of raised ribs 70. In the preferred embodiment shown, three convexly-shaped ribs 70 extend from lower surface 68 of bottom member 60. Between each pair of ribs 70 is a corresponding valley 72.

Each rib 70 contacts gate 20 along a narrow area of surface contact 74. Because there are a plurality of narrow strips of contact 74, the overall pressure exerted by seal 52 on gate 20 can be reduced. This provides a more effective seal against fluid leakage, and also decreases the rate at which the ribs 70 are worn.

In addition, as casing 54 is worn over time from the constant force applied by gate 20, it is primarily only ribs 70 which are being worn. The area of contact 74 between ribs 70 and gate 20 then increases, while the pressure applied by the seal decreases. Until ribs 70 are completely worn, transverse seal 52 provides spaced areas of contact 74 at a lower pressure. Once ribs 70 are completely worn from lower surface 68 of bottom member 60, casing 54 acts as a single, larger area of surface contact.

Packing material 56 is disposed within cavity 64. Preferably, this packing is of a putty type consistency and is typically made of ground teflon and petroleum jelly. Packing material 56 supports and maintains the shape and positioning of casing 54 against gate 20. Packing 56 further ensures that pressure is maintained by casing 54 against gate 20.

Another component of transverse seal 52 are scraping blades 58. In the preferred embodiment shown, two scraping blades 58 are used in conjunction with each transverse seal 52. Each scraping blade 58 is a substantially rigid member having a generally rectangular cross section. Preferably, scraping blade 58 is made from fiberglass filled phenolic. Scraping blade 58 may also be made from brass or stainless steel, depending on the use of the valve and the material which is flowing through the corresponding pipe. Scraping blade 58 is placed adjacent to leg members 62, but outside of cavity 64. Scraping blades 58 fit snugly into the slot provided by leg member 62 and its corresponding flange 76. Flange 76 extends from the terminal end of leg member 62 parallel to bottom member 60, but away from cavity 64. Scraping blade 58 is dimensioned such that it protrudes slightly into gate receiving channel 38, in a manner and extent similar to ribs 70 on casing 54. Thus, scraping blade 58 is also in continual contact with gate 20.

Flange 76 provides positioning support for scraping blade 58. With this configuration, there is constant contact between flange 76 and scraping blade 58. Scraping blades 58 secure casing 54 within notch 50 by trapping flange 76 against the back wall 66 of notch 52.

Scraping blades 58 also serve to clean material and debris from planar surfaces 26 of gate 20. When the gate is in the closed position, it will come into contact with the flowing material. As the gate is raised into chest 34, inboard scraping blade 58A wipes any standing debris from planar surface 26 of gate 20. Thus, none of the material flowing through pipe 100 is allowed to seep into chest 34 or bonnet 36 or the surrounding environment. Outboard scraping blade 58B cleans debris from gate 20 as it is lowered from bonnet 36 into body 32. Outboard scraping blade 58B thus prevents debris which has collected from the surrounding environment from entering transverse seal 52.

Figure 2:
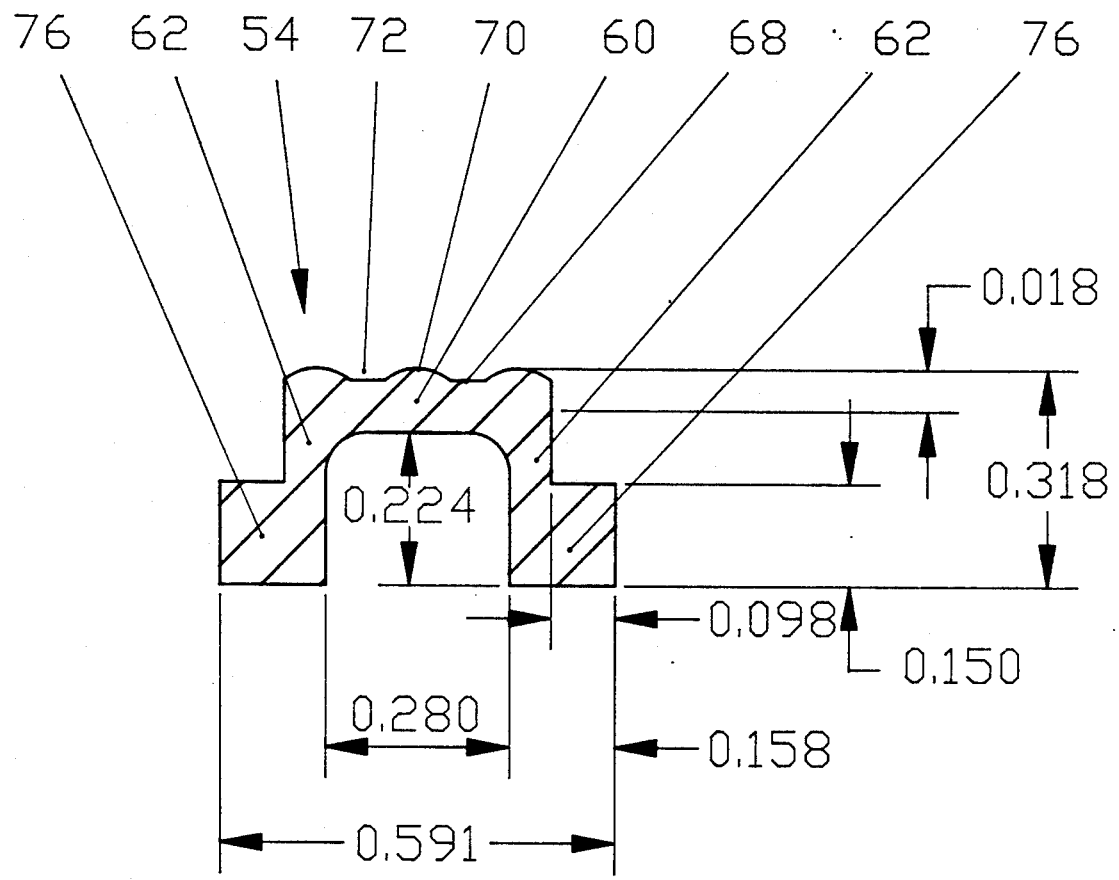
FIG. 2 shows an enlarged view of the casing element shown in FIG. 1.

As noted above, VITON is a preferred material for casing 54. When using VITON material of 70-80 Durometer, Shore A, the preferred dimensions of casing 54 in typical valves are as shown in FIG. 2. The length of casing 54 can be selected to fit notches 50 of typical valves. Scraper blades 58 perferably have a width of 0.095" and a height of 0.195" with a length equivalent to that of casing 54. As will now be readily understood by those of ordinary skill in the art, the tolerances of these dimensions can be established by ordinary engineering principles according to the environment of actual usage and desired costs of production.

Many means may be used to move the gate 20 within the gate receiving channel 38. In the preferred embodiment, a manual handwheel 82 is used. Other devices, such as cylinder or motor actuators (not shown), may be used. By turning handwheel 82, gate 20 can be raised or lowered.

Once gate 20 is in the desired position, it may be necessary to retain the gate in place. The present invention includes a retention mechanism for securing the position of gate 20. This retention mechanism includes locking hole 28, which is provided by gate 20 and retention pin 84. The retention mechanism also utilizes a plurality of pin receptacles 86 within bonnet 36.

When gate 20 is in a desired position, retention pin 84 can be placed through locking hole 28 and into pin receptacle 86. This prevents any translation between gate 20 and valve assembly 30. A padlock 90 can then be attached to retention pin 84 to prevent disengagement of the pin from locking hole 28 and pin receptacle 86. In the preferred embodiment shown, retention pin 84 further includes a shackle bore 88 through which the padlock can be secured to the locking pin.

It is often advantageous to be able to visually determine, from a distance, whether a knife gate valve is open or closed. The retention mechanism of the present invention provides the means to make this determination. One can see if retention pin 84 has secured gate 20 in an open or closed position. It is not necessary to be physically close to the valve. This visual determination is enhanced by coloring retention pin 84 with a bright or fluorescent paint. The precise location can then be determined, when viewed against a plain or dull colored background.

Although the present invention has been described above in detail, the same is by way of illustration and example only and is not to be taken as a limitation on the present invention. The scope and content of the present invention are defined only by the terms of the claims appended hereto.

What is claimed is:

1. A gate valve comprising a housing having a generally flat gate movable therein; a transverse seal contacting said gate, said seal including a generally U-shaped casing having a bottom member and two oppositely disposed leg members, said bottom member and said leg member generally defining a cavity therebetween, each leg member including a foot extending from the terminal end of the leg in a direction generally transverse to the leg member and outwardly from said cavity;

a scraper blade in contact with said gate and fitted restrictively between said housing and one of said leg members of the casing in overlying abutting contact with the foot extending from said one leg member, said last mentioned foot constituting means for biasing each scraper blade into contact with said gate for cleaning said gate as it moves between open and close positions;

and packing material disposed within said casing cavity and constituting means for biasing said cavity bottom member against said gate in sealing engagement with the gate when said gate is in said open and close positions.

2. The valve according to claim 1 wherein said gate valve includes a second scraper blade restrictively positioned between said housing and the other of said leg members of the casing in overlying abutting contact with the foot extending from said other leg member.

* * * * *